(12) United States Patent
Aspinwall

(10) Patent No.: X8801
(45) Date of Patent: Apr. 22, 1835

(54) BLOCK SHEAVES, FRICTION BUSHES OR BOXES FOR

(76) Inventor: Lewis Aspinwall

Lewis Aspinwall
Letters Patent

The Schedule referred to in these Letters Patent and making part of the
same containing a description in the words of the said Lewis Aspinwall
himself of his improvement in making friction bushes or boxes for the shives
for blocks and for other purposes

---

To all persons to whom these presents shall come. Be it known that I
Lewis Aspinwall of Albany in the County of Albany and State of New York,
have invented a new and useful improvement in the art or mode of cast-
ing friction bushes for block shives and for any other purpose for which such
bushes may be wanted. These bushes have been heretofore cast in sand or
other earth and afterwards finished by turning, drilling &c. which mode as
the metal of which they are made is necessarily hard is comparatively slow
and tedious. Now the improvement of which I here claim to be the inventor
is the casting all parts of said friction bushes (except the pins or studs, which
may be made of wire. in smooth metallic moulds in such manner as to need
no finishing by turning or any other operation after having the moulds ex-
cept champering or taking the sharp corners from the cylinders which also
may be effected in the moulds, but which I think best to do afterwards and
also except taking off the sprues or gates from the several articles. To under-
stand this more fully, it may be proper to state that the common patent
friction bush now in use consists of a cylindrical box commonly made in
two halves, put together latitudinally each of which halves is open at the
end making when put together a cylinder, open at each end, with an
inward flange at each end to contain and steady the rollers and this
hollow cylinder contains six more or less friction rollers which roll round
within the said box leaving the intermediate space in the center for the pin
axis, shaft or gudgeon, on which they are to turn, or which is to turn in
them. the whole of the article then consists of two similar half boxes and of the
rollers each of which rollers is simply a plain cylinder with a small hole
at each end for the steady pins, together with two flat circular rims containing
the the steady pins, which two rims are also held together by any convenient number
of studs of wire, the ends of which are rivetted on the outsides of the said circular
plates or rims. But the cylindrical box which contains the rollers may be cast
whole instead of being in halves and the form and proportions of the whole may be
varied to suit the use for which it is intended. To save the labor and consequent
cost of turning and other work in finishing. I cast the said boxes, rollers,
and circular rims with the steady pins in smooth metallic moulds neat-
ly fitted together to suit the form of each article; so that they leave the
mould in a state of complete finish ready to be put together with the ex-
ceptions above named. My moulds I make of cast or wrought iron, but
they may be made of any other suitable metal; but of whatever metal made,
I claim the casting said articles in smooth metalic moulds so as to need
no subsequent finish except as already excepted, as my invention and con-
stituting the improvement herein specified. The exterior form of the moulds
and the modes of putting them together may be so infinitely varied and is
so much dependent on the fancy of the constructor as to need no specific de-
scription.

Witnesses
Jo, Cole
Saml, Blydenburgh

Lewis Aspinwall (658 words)